United States Patent [19]

Van Pottelberg

[11] 4,255,970
[45] Mar. 17, 1981

[54] BAROMETER MECHANISM

[76] Inventor: Gaston C. Van Pottelberg, R.R. #1, Palgrave, Ontario CON 1 PO, Canada

[21] Appl. No.: 95,745

[22] Filed: Nov. 19, 1979

[30] Foreign Application Priority Data

Dec. 13, 1978 [CA] Canada .................................. 317902

[51] Int. Cl.³ .............................................. G01L 7/12
[52] U.S. Cl. ...................................... 73/386; 73/729
[58] Field of Search .............. 73/386, 387, 729, 432 A

[56] References Cited

U.S. PATENT DOCUMENTS

| | | | |
|---|---|---|---|
| 1,835,561 | 12/1931 | Eshbaugh | 73/732 |
| 2,297,679 | 10/1942 | Allen | 73/715 |
| 3,397,578 | 8/1968 | Klumb | 73/386 |
| 3,728,898 | 4/1973 | Schlenker | 73/386 |
| 3,874,212 | 4/1975 | Csaposs | 73/386 |
| 4,168,631 | 9/1979 | Wetterhorn et al. | 73/741 |

*Primary Examiner*—Donald O. Woodiel
*Attorney, Agent, or Firm*—Arne I. Fors; Robert F. Delbridge

[57] ABSTRACT

An improved barometer mechanism is described having a simplified mechanical structure with a high degree of sensitivity. The barometer bellows is partially evacuated of air to a pressure about 10 kilopascals below normal atmospheric pressure and connected mechanically to a pressure indicator by a novel compound lever arrangement utilizing a pair of operably interconnected simple levers.

9 Claims, 4 Drawing Figures

BAROMETER MECHANISM

This invention relates to a barometer and is particularly directed to a barometer of simplified mechanical structure and function with high sensitivity to atmospheric pressure changes.

Conventional barometers utilize pressure-sensitive bellows which are substantially completely evacuated of air and compensated by a tension spring to avoid collapse and to attain sensitivity in a desired ambient pressure range. These conventional instruments are structurally and functionally complex and, as a result, expensive to assemble.

It is a principal object of the present invention to provide a barometer mechanism which is simple in construction and function and relatively inexpensive to assemble.

It is another object of the present invention to provide a barometer mechanism which, although simple in construction, has a high degree of sensitivity and accuracy.

The barometer mechanism of my invention comprises, in general, a base, a bellows having a pair of opposed co-extensive walls joined about their peripheries to form a sealed chamber and one of said walls rigidly mounted on said base whereby changes in ambient air pressure results in movement of the second wall towards and away from the mounted wall, a compound lever comprising a pair of simple levers operably contacting said movable second wall for transmitting and amplifying movement of said second wall as substantially linear motion remote from said second wall, a spindle journalled on a first of said simple levers for rotation, a helical spring concentric with and mounted on said spindle adapted to bias said spindle in a first direction of rotation, flexible connecting means secured to and wrapped about said spindle in a direction opposite to the said first direction of rotation and connected to the second of said simple levers, whereby bias of said helical spring on said spindle tensions the flexible connecting means and maintains the first of said simple levers through said second lever in continuous abutment against the movable wall of the bellows for sensing changes in ambient air pressure and transmitting changes in pressure to the spindle for rotation thereof.

The foregoing objects and advantages of my invention and the manner in which they can be attained will become apparent from the following detailed description of the drawings, in which.

Like reference characters refer to like parts throughout the description of the drawings.

Figure 1:
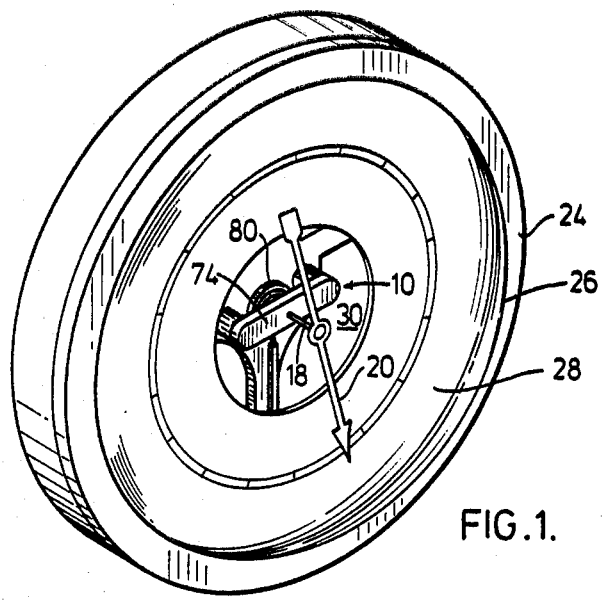
FIG. 1 is a perspective view of a barometer incorporating the mechanism of my invention.
Figure 2:
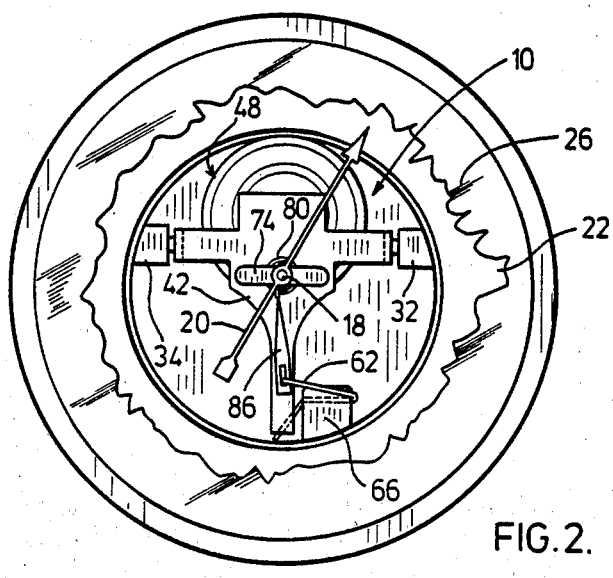
FIG. 2 is a plan view of the barometer shown in FIG. 1, with the fascia partly cut away, showing the general assembly of component parts.
Figure 4:
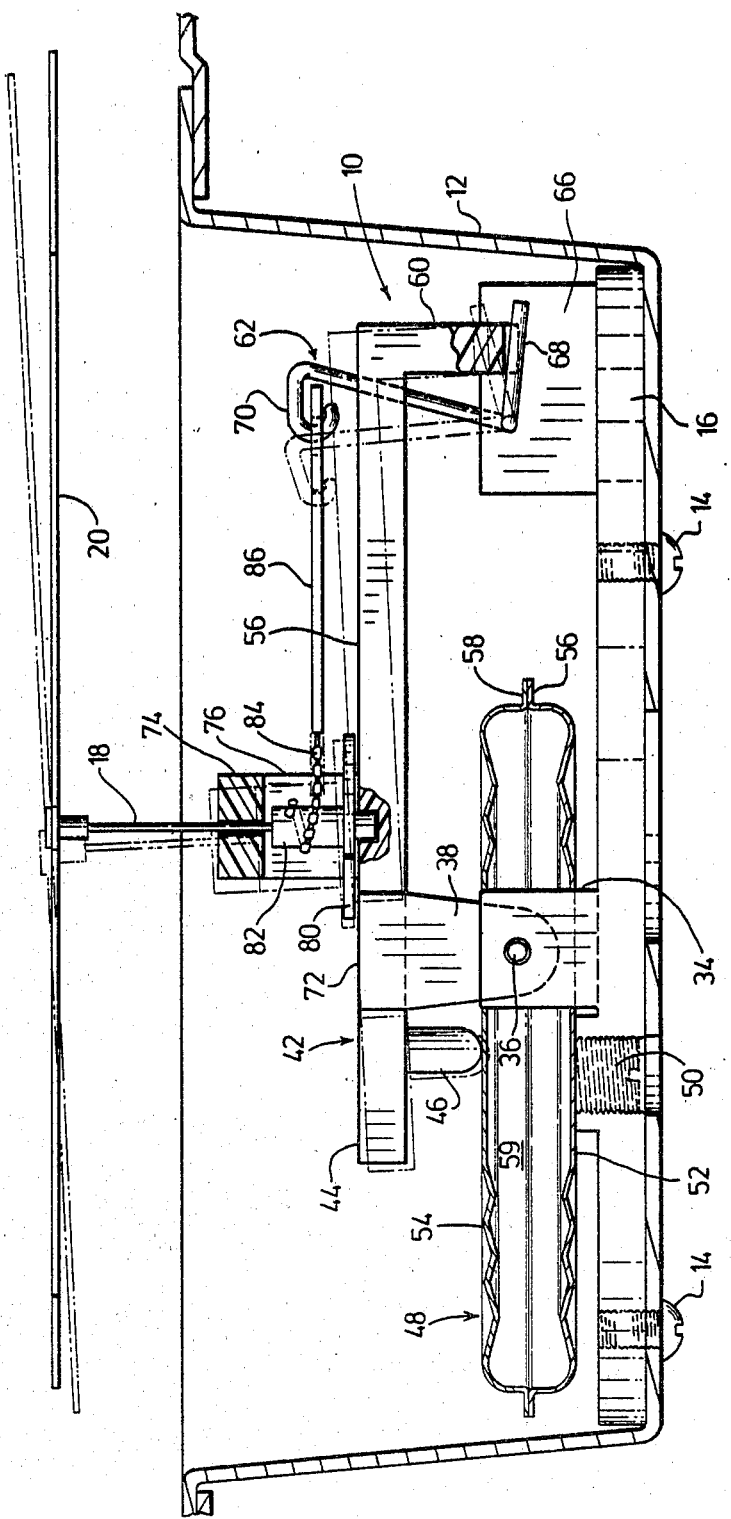
FIG. 4 is a sectional view of the said mechanism illustrating the functional relationship of the component parts.

With reference now to FIGS. 1, 2 and 4, the mechanism of the present invention designated by numeral 10 is mounted within housing 12 and secured thereto by screws 14 extending into base 16. Spindle 18 extending from mechanism 10 supports indicator 20 which is free to rotate in the enlarged section 22 of housing 12. With specific reference to FIGS. 1 and 2, indicator 20 conventionally rotates in a clockwise direction to indicate an increase in air pressure, i.e. atmospheric pressure, and to rotate in a counterclockwise direction to indicate a decrease in said pressure. A bezel rim 24 secures glass cover 26 to the face of the housing 12.

A face plate or fascia 28 having a circular opening 30 formed in the centre thereof, shown intact in FIG. 1 and partially cut away in FIG. 2 for clarity of illustration, bears conventional indicia indicating barometric pressures and corresponding weather conditions.

Figure 3:
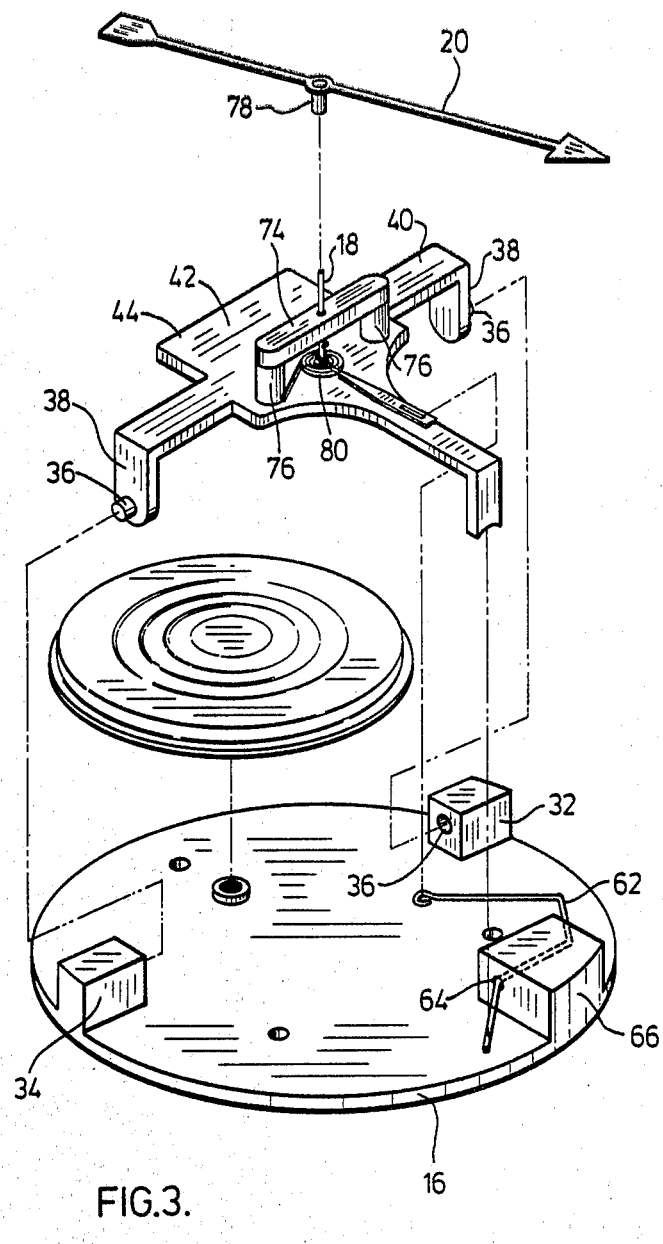
FIG. 3 is an exploded perspective view of the said mechanism indicating assemblage of the component parts.

The mechanism of my invention, shown most clearly in FIGS. 3 and 4, includes a base 16 having a pair of spaced-apart shoulders 32,34 with holes 36 formed on opposed sides adapted to receive laterally extending stub shafts 37 formed on the outer surfaces of depending portions 38 of transverse arm 40 of simple lever 42 whereby lever 42 can pivot about a transverse axis passing through stub shafts 37. Rearward arm 44 of lever 42 has downwardly depending projection 46 formed thereon adapted to abut the central portion of wall 54 of bellows 48 which is rigidly mounted on base 16 by threaded rod 50 rigidly secured to bellows wall 52.

Bellows 48 comprises the pair of opposed walls 52,54 secured together at abutting radial flanges 56,58 extending from the respective peripheries thereof. The interior cavity 59 of bellows 48 is partially evacuated of air to a pressure in the range of 85 to 95 kilopascals (kPa), preferably about 90 kPa.

The opposite end of lever 42 has forwardly extending arm 56 substantially longer than the effective length of arm 44 defined between projection 46 and the pivot axis of lever 42, preferably in a ratio of about 5:1, to amplify vertical movement of projection 46 of arm 44 at downwardly depending projection 60 formed at the opposite end of arm 56.

A second simple lever 62 journalled in transverse opening 64 formed in upstanding post 66 forming part of base 16 is mounted for pivotal movement such that movement of portion 60 of simple lever 42 engages extension 68 of lever 62, extension 68 being bent at an angle of about 45° to the axis of rotation of lever 62 causing upstanding portion 70, which is bent at about 90° to the axis of rotation of lever 62 and about 90° to lever extension 68, to pivot in an arc of limited travel in a direction substantially perpendicular to the reciprocal movement of projections 46 and 60.

Spindle 18 is journalled for rotation at one end in the upper surface 72 of lever 42 and intermediate its ends in a cross member 74 supported on and spaced from lever 42 by a pair of spaced-apart posts 76 to substantially straddle the center of lever 42. Spindle 18, centrally located within housing 12, carries indicator 20 by engagement of socket 78 formed on indicator 20 with the free upstanding end of spindle 18. A helical spring 80 concentric with and mounted on the enlarged portion 82 at the base of spindle 18 is secured to spindle 18 at its interior end and abuts post 76 at the other exterior, as shown most clearly in FIG. 3, to normally bias spindle 18 in a clockwise direction, as viewed in FIGS. 1–3. A flexible chain or wire 84, secured to the enlarged portion 82 of spindle 18 and wrapped in a counterclockwise direction about said portion 82, is connected to the extension 70 of second lever 62 by connector 86, as shown most clearly in FIG. 4, to complete the mechanical interconnection of spindle 18 to bellows 48.

Housing 12 preferably is formed of light gauge tinplated steel or of aluminum. Base 16 and first lever 42 preferably are formed of a rigid plastics material by injection molding. Bellows 48 conventionally is formed of light gauge brass having a thickness of 0.005 inches with the component parts secured together by ultrasonic welding. Second lever 62 is formed of spring steel.

In operation, changes in ambient air pressure result in bellows wall 54 moving towards or away from stationary wall 52 which is anchored to base 16 by threaded shaft 50. An increase in the atmospheric pressure, for example, would result in wall 54 moving towards wall 52 with the result that projection 46 and arm 44 of lever 42 move downwardly, as indicated by the ghost lines in FIG. 4, raising opposite arm 56 a distance several times that of the distance of movement of projection 46 proportional to the relative effective lengths of the two arms. The upper portion 70 of second lever 62 normally is biased towards spindle 18 due to the urging of helical spring 80 whereby lower extension 68 is pivoted upwardly to normally abut downward projection 60 of lever 42. As arm 56 and downward extension 60 of lever 42 are raised, extension 68 is free to pivot upwardly and lever portion 70 pivots inwardly under the influence of spring 80 through chain 84 and connector 86. Indicator arm 20 rotates in a clockwise direction, as viewed in FIGS. 1 and 2, indicating an increase in barometric pressure. A decrease in pressure conversely results in bellows wall 54 moving away from stationary wall 52 to return levers 42 and 62 to, for example, the position indicated by the solid lines of FIG. 4 with a resulting counterclockwise rotation of indicator 20 indicating a drop in barometric pressure.

The mechanism of the present invention provides a number of important advantages. The structure and function of the mechanism is relatively simple compared to conventional known mechanisms and a high degree of sensitivity is provided by the partial evacuation of air within the bellows.

It will be understood, of course, that modifications can be made in the embodiment of the invention illustrated and described herein without departing from the scope and purview of the invention as defined by the appended claims.

What I claim as new and desire to protect by Letters Patent of the United States is:

1. A barometer mechanism comprising, in combination, a base, a bellows having a pair of opposed coextensive walls joined about their peripheries to form a sealed chamber and one of said walls rigidly mounted on said base whereby changes in ambient air pressure result in movement of the second wall towards and away from the mounted wall, a compound lever comprising a pair of simple levers operably contacting said movable second wall for transmitting and amplifying movement of said second wall as substantially linear motion remote from said second wall, a spindle journalled on a first of said simple levers for rotation, a helical spring concentric with and mounted on said spindle adapted to bias said spindle in a first direction of rotation, flexible connecting means secured to and wrapped about said spindle in a direction opposite to the said first direction of rotation and connected to the second of said simple levers, whereby bias of said helical spring on said spindle tensions the flexible connecting means and maintains the first of said simple levers through said second lever in continuous abutment against the movable wall of the bellows for sensing changes in ambient air pressure and transmitting changes in pressure to the spindle for rotation thereof.

2. A barometer mechanism as claimed in claim 1, in which the base has a pair of spaced-apart shoulders formed thereon, the first of the simple levers comprises a member having a transverse pivot axis intermediate its ends and means formed on said member for engagement with the spaced-apart shoulders for pivotal movement of the said lever about the axis, one end of the lever member forms a first arm extending rearwardly from the pivot axis and having a depending projection adapted to abut the movable second wall of the bellows, and the other end of the lever member forms a second arm extending forwardly from the pivot axis substantially longer than the said first arm adapted to abut the second of the simple levers.

3. A mechanism as claimed in claim 2, in which said second arm has a length ratio to said first arm of about 5:1 for amplifying movement of the projection of the first arm.

4. A mechanism as claimed in claim 2, in which said second of said simple levers comprises an elongated member journalled for pivotal movement in the base, said second lever member having an extension bent at an angle of about 45° to the axis of rotation of the said lever for engagement with the second arm of the first lever member, said second lever member having an upstanding portion bent at an angle of about 90° to the axis of rotation of said second lever and an extension bent at about 90° to said upstanding portion whereby said extension to the upstanding portion is substantially parallel to the axis of rotation and spaced therefrom, whereby pivotal movement of said first lever member in one direction is translated to pivotal movement of said second lever member perpendicular to said first lever movement.

5. A mechanism as claimed in claim 4, in which said first lever member has a cross member formed thereon and spaced therefrom substantially straddling the center of said member for journaling said spindle.

6. A mechanism as claimed in claim 5, in which said flexible connecting means secured to and wrapped about said spindle comprises a flexible chain or wire operatively connected at one end to the upstanding portion of the second lever member and at the other end to the said spindle.

7. A mechanism as claimed in claim 1, 4 or 5, in which the bellows are partially evacuated of air to a pressure in the range of 85 to 95 kPa.

8. A mechanism as claimed in claims 1, 4 or 5, in which said bellows is partially evacuated of air to a pressure of about 90 kPa.

9. A mechanism as claimed in claims 1, 4 or 5, in which said base has a circular shape with the shoulders mounted on the periphery thereof, and which additionally comprises a cylindrical housing adapted to receive said mechanism therein and an enlarged circular facia secured to said housing having a circular opening for the said spindle therein.

* * * * *